United States Patent [19]

Lundsager

[11] 3,907,710

[45] Sept. 23, 1975

[54] HOLLOW CERAMIC PELLETS FOR CATALYST SUPPORT

[75] Inventor: Christian Bent Lundsager, Ashton, Md.

[73] Assignee: W. R. Grace & Co., New York, N.Y.

[22] Filed: Apr. 18, 1973

[21] Appl. No.: 352,165

[52] U.S. Cl......... 252/455 R; 252/462; 252/466 PT; 252/477 R; 423/213.2; 423/213.5
[51] Int. Cl.$^2$.................. B01J 23/10; B01J 23/56
[58] Field of Search............ 252/477 R, 462, 455 R; 423/213.2, 213.5

[56] References Cited
UNITED STATES PATENTS

| 2,408,164 | 9/1946 | Foster | 252/477 R |
|---|---|---|---|
| 3,166,382 | 1/1965 | Purse et al. | 423/213.2 |
| 3,538,020 | 11/1970 | Heskett et al. | 252/477 R |
| 3,554,929 | 1/1971 | Aarons | 252/477 R |
| 3,565,830 | 2/1971 | Keith et al. | 252/477 R |
| 3,644,098 | 2/1972 | De Palma et al. | 423/213.2 |
| 3,681,260 | 8/1972 | Foucher et al. | 252/477 R |
| 3,741,725 | 6/1973 | Graham | 423/213.5 |
| 3,776,859 | 12/1973 | Simpson | 252/462 |

*Primary Examiner*—W. J. Shine
*Attorney, Agent, or Firm*—Joseph P. Nigon

[57] ABSTRACT

A support structure useful in catalyst systems for converting the noxious components of automobile exhaust gases to innocuous entities is disclosed. The support is in the form of reinforced tubular structure and is characterized by excellent stability and very high surface area per unit weight. The structure is also useful as a packing medium for reaction towers, as a support for catalysts in organic reactors and as a support for adsorbent materials.

4 Claims, 4 Drawing Figures

HOLLOW CERAMIC PELLETS FOR CATALYST SUPPORT

BACKGROUND OF THE INVENTION

Supports for use in auto exhaust conversion systems have very exacting specifications. The catalyst is in one or two forms. In one system the catalyst composition is distended on a monolithic structure that is generally a ceramic cylinder that has a series of channels extending the full length of the monolith structure. These monolithic catalysts structures are advantageous in that the surface area per unit weight is very high. They have the disadvantage of frequently being fragile and subject to breakage or thermal damage and are difficult to make.

The alternative structures are pellets, pills, extrudates, etc. These are solid bodies that are generally a maximum of one inch in the longest dimension. These pellets, pills, extrudates, etc., have the advantage of generally satisfactory thermal stability, however, their surface area per unit weight leaves much to be desired.

BRIEF DESCRIPTION OF THE INVENTION

This invention relates to a catalyst support structure which incorporates the advantages of the pelleted catalyst with the high surface area of the monolithic catalyst. These structures are prepared from extrudates having a unique shape that is best described as a small tubular structure that is reinforced in both directions. These supports have about the same dimensions as the conventional extrudates but a substantially higher surface area than the solid extrudates. In addition, they exhibit improved catalytic properties as well as satisfactory abrasion resistance, and crush strength.

DETAILED DESCRIPTION OF THE INVENTION

For purposes of simplicity we will describe the invention with reference to the preparation of our novel catalyst supports wherein the final product is a cordierite structure although obviously the same technique can be employed to prepare mullite, alumina, spinel, etc., structures. The catalyst structures of our invention can be prepared from a starting material consisting of a ceramic powder such as alumina, cordierite, mullite, spinel, etc., a polyolefin, and a plasticizer. The polyolefin used is the high molecular weight polyolefin, more specifically, a polyolefin having a molecular weight of at least 150,000. This polyolefin is a good binder for the cordierite or other filler material and can tolerate high filler loading without becoming brittle when a plasticizer is present. It is important that the polyolefin be a high molecular weight polymer since low molecular weight polymers, (molecular weight 60,000 to 100,000) yield brittle products at relatively low filler concentrations. The polymer and filler are blended together and a plasticizer is incorporated into these blends to provide good flow characteristics and facilitate mixing without causing excessive loss of flexibility.

Each of the components, the polyolefin, the filler, and the plasticizer are essential for retaining the desirable performance of the binder system.

In a typical system the composition consists of 5–70 volume percent polyolefin, 50–80 volume percent plasticizer, and 45–80 volume percent cordierite or other ceramic powder. The preferred ranges are 5–50 volume percent polyolefin, 20–60 volume percent plasticizer, and 20–50 volume percent of the ceramic powder material. The polyolefin used for preparing our novel product is a high molecular weight polyethylene or copolymers such as ethylene-butene copolymers or other polyolefins having a standard load (2,160 grams) melt index of 0.0 a high load (21,600 grams) melt index of 1.8, a density of 0.93 to 0.97, a viscosity of about 4 measured as 0.02 grams of polymer and 100 grams of decalin at 130°C.

The melt index is a polyolefin flow at standard conditions of temperature and pressure to an orifice of definite diameter and length as described in ASTMD 1,238 ATS Condition F (Measured Flow Rates of Thermoplastics by Extrusion Plastometer). The rate of extrusion in grams per 10 minutes is the melt index and is used to indicate the average molecular weight of the polymer. The lower the molecular weight of the polymer, the more rapidly it extrudes and, therefore, the melt index increase as the molecular weight decreases.

By High Load Melt Index (HLMI) is meant the melt index as determined by the procedure of ASTMD 1,238 – 65 Condition E except that a weight of 21,600 grams is used.

Several plasticizers give satisfactory results and it is advantageous to use a plasticizer that is soluble in water. By using a water soluble plasticizer the extraction will be more economical, due to the low cost and relative safety of water in comparison with that of organic solvents. The extraction process will also be much safer as there are no fire or toxicity hazards encountered.

Examples of the water insoluble plasticizers include: dibutyl sebacate, diisododecyl phthalate, zinc stearate, stearic acid polyethylene glycol distearate, epoxidized vegetable oil, tricresyl phosphate, petroleum oil, paraffin oil, wax, hydrocarbon resin, asphalt, eicosane, tall oil, linseed oil, and oxidized polyethylene wax.

Examples of water soluble plasticizers include diethylene glycol, propylene glycol, dipropylene glycol, glycerin, glycerol monoacetate, trimethylene glycol, tetramethylene glycol, triethyl phosphate, polyvinyl alcohol and polyvinyl pyrrolidone. It is also possible to make the product of this invention using various combinations of the above mentioned plasticizers such as the usage of water soluble and a water insoluble plasticizer with the ceramic powder material and high density polyethylene. The ceramic powdered materials used in the preparation of our novel catalyst support are well known. The preferred ceramic powder is cordierite, however, mullite, spinel, and alumina also give satisfactory results.

The solvent used to extract the plasticizer, of course, depends on the type of plasticizer used. Examples of suitable organic solvents include, hexane, heptane, benzene, chlorinated solvents such as carbon tetrachloride, trichloroethylene and perchloroethylene, for example, petroleum ether, diethyl ether, etc.

The mixture from which our novel catalyst support is prepared is normally compounded by mixing the high molecular weight polyolefin, the ceramic powdered material and the plasticizer in any of the commercially available mixers, such as a "dough mixer" for example. However, in some cases the ceramic powders and plasticizers are stirred together at room temperature in a volatile solvent which is evaporated before the material is combined with the polyethylene. The polyolefin-ceramic powder-plasticizer dry blend is then mixed in a suitable commercially available mixer such as a Brabender Plastograph. The preferred mixing procedure is to feed the ceramic powder, polyolefin polymer, and plasticizer as separate streams to a compounding device where the components are heated to a temperature of 300°–500°F and working the mix until it is uniform. The time and temperature depend on the device used. However, the compounding is usually completed in 1 to 10 minutes. After the compounding is complete, the product is cooled and reduced to a convenient size for feeding to a conventional extruder. The essential feature of our invention results from the extrusion step. The pellets we prepare are hollow cylinders with internal reinforcing ribs to improve the crush strength and increase the surface area. The product is prepared by extruding a cordierite-polyolefin-plasticizer mix into a reinforced tube using a specially designed die and then cutting the tube to short lengths followed by extraction of the plasticizer and firing. The finished extruded shape can also be made by extrusion simultaneously with the hot compounding step.

The Figures show cross section views of typical extrudates of our invention. It is to be understood, however, that other configurations can also be extruded.

Figure 2:
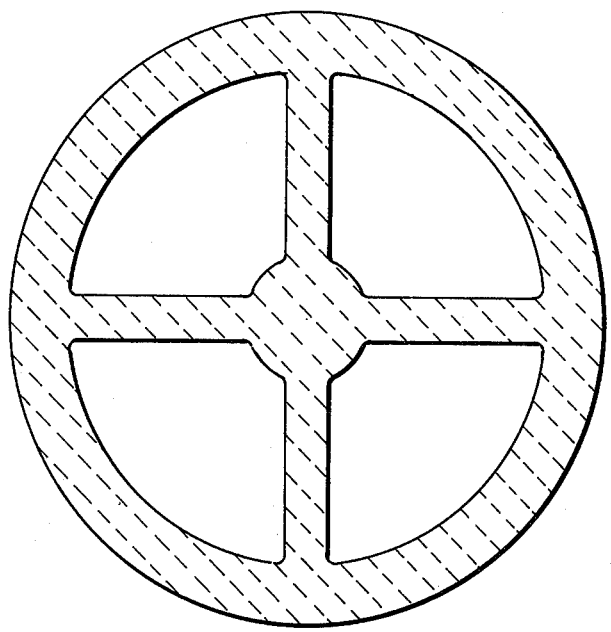
FIG. 2 is a cross sectional view taken along the line 2—2 of FIG. 1.
Figure 1:
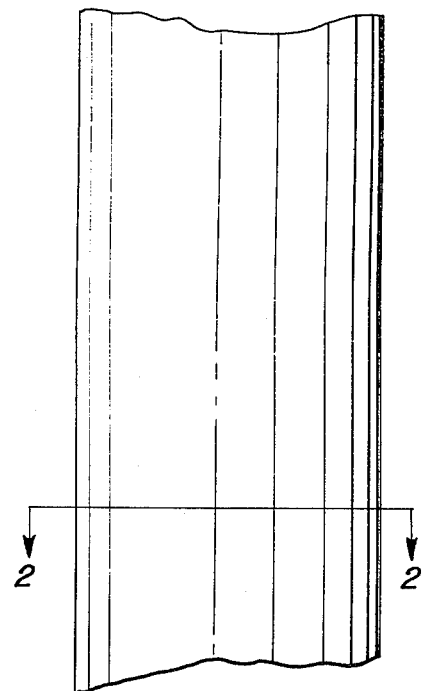
FIG. 1 shows the exterior of an extrudate with four internal ribs.
Figure 4:
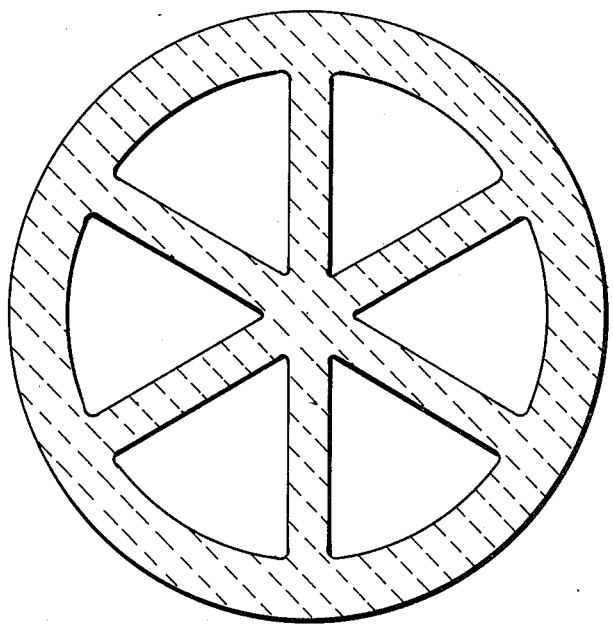
FIG. 4 is a cross sectional view taken along line 4—4 of FIG. 3.
Figure 3:
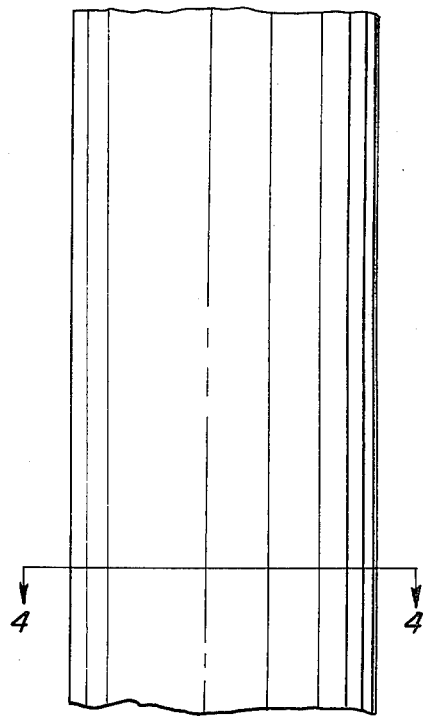
FIG. 3 shows the exterior of an extrudate with six internal ribs.

The product of our invention has several advantages: (1) the extrudates have a surface area of at least 50% greater than a hollow tube of the same diameter, approximately 3 times greater than the surface area of solid particles, (2) the extrudates have about one-half the weight of solid particles, (3) the extrudates of our invention heat up faster in use than solid pellets, (4) the extrudates of our invention exhibit a lower pressure drop than solid pellets in a catalytic system for treating exhaust gases.

After the extrusion, the extrudates are normally cut to the desired length, normally about equal to its diameter. It is most convenient to cut the extrudates at this stage rather than after the extraction of the plasticizer and final firing step, although it is obvious these steps can be carried out after extraction and firing as well.

The extraction step is conventional. The extrudates are contacted with an inorganic or organic solvent for the plasticizer used. The representative solvents for extracting organic plasticizers such as petroleum oil for example include trichloroethylene, tetrachloroethylene, carbon tetrachloride, methylene chloride, tetrachloroethane, hexane, benzene, petroleum ether, toluene, cyclohexene, and gasoline. Illustrative solvents useful for extracting water soluble plasticiziers include polyethylene glycol, water, ethanol, methanol and acetone.

The extraction temperature can range from room temperature (25°C) to the melting point of the polyolefin component, so long as the polyolefin does not dissolve. The period of time required to carry out the extraction will vary depending on the temperature used and the nature of the plasticizer being extracted.

After the plasticizer has been extracted, the structure is heated to above the degradation temperature of the thermoplastic to burn off the polyolefin. A degradation temperature in the range of at least 240° to 260°C is preferred to initiate degradation. At a temperature of about 240°C (when polyethylene is the polyolefin,) the structure begins to turn black and at about 700°C the structure begins to turn white indicating that the thermoplastic has entirely burned off. When the thermoplastic is completely burned off the temperature is increased to that at which the particular powder sinters into a monolithic structure while retaining its microporosity. When using the preferred ceramic powder, (cordierite) a temperature of about 1,300°–1,450°C is recommended. The temperature is maintained at the sintering point for about 2 hours and the extrudates are then allowed to cool slowly to room temperature. The cooling time is generally around 3 to 4 hours.

The resulting ceramic extrudates appear identical in shape to the original extrudates except that there is a slight linear shrinkage in the order of 2–15 percent, depending on the ceramic. The shrinkage is only about 2–5 percent when cordierite is the ceramic.

The extrudates of our invention were evaluated as a catalyst support by preparing a slip containing the catalytically components and coating the extrudates with this slip. The excess slip is removed and the extrudates dried and calcined.

The auto exhaust catalyst of my invention is distended on a reinforced porous tubular ceramic support having a diameter of from about 3 to 12 mm and a length of about equal to the diameter said support characterized by:

a. a geometric surface area of at least 50% greater than a hollow tube of the same diameter,
  b. a crush strength of at least 10 pounds, and
  c. a microporosity of 20 to 50% by volume.

The tubular ceramic support is coated with about 5 to 10 wt. percent of an alumina containing 5 to 20 percent ceria, and about 0.02 to 0.8 wt. percent of platinum, palladium or mixtures thereof, based on the weight of the catalyst.

The finished catalyst was evaluated using the procedure described in detail in the Federal Register of July, 1970 as modified by the instructions in the Federal Register of July, 1971.

Both of these publications are incorporated herein by reference. Broadly speaking, this test is designed to determine the hydrocarbon, carbon monoxide, the oxides of nitrogen gas emissions while simulating the average trip in an urban area of 7½ miles from a cold start. The test consists of an engine start up and vehicle operation on a chassis dynamomter to a specified driving schedule consisting of a total of 1,371 seconds. A proportionate part of the diluted gas emissions is collected continuously for a subsequent analysis using the constant volume sampler technique.

The dynamometer run consists of two tests, a cold start test after a minimum of 12 hours soak, and a hot start test with a 10 minute soak between the two tests. Engine start up and operation over the first 505 seconds of the driving schedule completes the hot start test.

Engine emissions are diluted with air to a constant volume and a portion sampled during each test. The composite samples are collected in bags and analyzed for hydrocarbons, carbon monoxide, carbon dioxide, and oxides of nitrogen. Parallel samples of diluted air are similarly analyzed for hydrocarbons, carbon monoxide, and oxides of nitrogen.

The gasoline used in the test is 100 octane gasoline containing less than 0.5 grams of organic leads per gal- Ion. The gas samples are analyzed for hydrocarbons by a flame ionization detector. Carbon monoxide and carbon dioxide are determined by nondispersive infrared analysis. Nitrogen oxides are analyzed by nondispersive infrared and ultra violet analysis.

Our invention is further illustrated by the following specific, but nonlimiting examples:

EXAMPLE 1

A batch of hollow pellets were prepared by extruding a cordierite-polyethylene-mineral oil mixture in a commercially available extruder using a die that produced an extrudate having six internal ribs similar in cross section to the extrudate shown in FIG. 2.

The extrudates were one-fourth inch in diameter and were cut into pellets about one-fourth inch long. The plasticizer was removed by immersing the pellets in trichloroethylene at about 25°C for 2 hours. The pellets were dried and heated to about 240° to 700°C over a period of 2 hours to burn off the polyethylene. The pellets were then sintered at about 1,400°C for 2 hours.

The hollow pellets were cooled to room temperature and found to have a crush strength of 12 pounds measured on the diameter.

The bulk density, pressure drop, and surface area were determined and compared to these properties of solid pellets and a monolith having 256 openings per square inch and a 10 mil wall thickness. These data are set out in the Table below:

|  | Hollow Pellets | Solid Pellets | Monolith |
|---|---|---|---|
| Bulk Density lbs./cu ft. | 40 | 54 | 40 |
| Surface area in ²/cu ft | 71,000 | 28,000 | 92,000 |
| Pressure Drop | Medium | High | Low |

It is apparent from these data that the hollow pellets of this invention are comparable with monolithic structures and are a substantial improvement over solid pellets. The water pore volume of the hollow pellets was determined by exposing the pellets to nitrogen gas containing substantial quantities of water and measuring the volume of water absorbed by a definite volume of pellets. This measurement was designated as the microporosity. The hollow pellets had microporosities of 20–50 volume percent. Monoliths also exhibit microporosities in this range.

EXAMPLE 2

A catalyst was prepared using our novel extrudates as a base using the following techniques.

A slip was prepared by mixing 606 grams of alumina containing 6% ceria, 250 grams of cerium nitrate (Ce($NO_3$)$_3$.6$H_2O$) 2,072 grams of water, 5 grams of nitric acid and 3.06 grams of platinum ammonium nitrate (Pt($NH_3$)$_4$ ($NO_3$)$_2$). The slip was prepared by mixing the components in a high shear stirrer.

Three thousand (3,000) grams of the calcined extrudates prepared by the process described previously and having 4 internal ribs were coated with this slip by pouring the extrudates into the slip, stirring for 10 seconds and pouring the mix into a moving basket centrifuge. The excess slip was removed immediately and completely from the channels of the extrudates using this technique.

The coated extrudates were dried for 3 hours at 250°F and then calcined for 2 hours at 1,200°F. The extrudates were then reimpregnated with a solution of palladium nitrate (Pd($NO_3$)$_2$) by immersing the extrudates in three liters of a solution of the palladium nitrate containing an equivalent of 5.37 grams of palladium. The reimpregnated extrudates were then again poured into a moving basket centrifuge to remove any excess materials from the channels. The extrudates are then dried at a temperature of 250°F for 3 hours. The product was calcined for 2 hours at 1,200°F.

The finished catalyst contained at 8% coating of 20% ceria-alumina and 0.053 weight percent platinum/palladium with the platinum/palladium being in a 1:3 weight ratio. A total of 0.04 troy oz. of the platinum/palladium mixture was distended on 260 cubic inches of the extrudates.

EXAMPLE 3

The catalyst prepared according to the process described in Example 1 was compared to a solid pelleted catalyst containing the same level of noble metals. The evaluation was carried out using the procedure described in the Federal Register referred to above. The results are set out in Table 1 below:

TABLE 1

|  | EMISSIONS IN GRAMS PER MILE | |
|---|---|---|
|  | HYDROCARBONS | CARBON MONOXIDE |
| CATALYST OF EXAMPLE 1 | 0.169 | 3.089 |
| CATALYST ON SOLID PELLETS | 0.22 | 3.60 |

It is apparent from these data that the catalyst on a support prepared according to the process of Example 1 give substantially better results that the catalyst containing the same level of catalytic agents on solid pellets. A very substantial improvement in hydrocarbon and carbon monoxide conversion is noted.

EXAMPLE 4

The catalyst was evaluated in a bench test designed to simulate the exhaust gas composition and heat up conditions experienced by catalysts in the initial part of the actual chassis dynamometer run described in the Federal Register reference. The test approximates the environment the catalyst will experience during the all-important "cold start" segment of the chassis dynamometer test which accounts for a substantial portion of the total carbon monoxide emitted. The catalyst prepared according to the process described previously and a catalyst prepared to contain the same level of catalytic agents on solid pellets were evaluated. The evaluation was carried out by filling the reactor to 13 cc of the reactor volume. The total gas rate was regulated to achieve a gas hourly space velocity of approximately 38,000. The simulated exhaust gas contained 250 parts per million hexane, 0.5 volume percent oxygen, 10 volume percent water vapor, 500 parts per million nitrogen oxide, 10 volume percent carbon monoxide with the balance made up by nitrogen. The gas mixture was preheated so that the inlet temperature to the bed of catalyst was 600°F. As the hot gases pass through the room temperature catalyst, the bed began to heat up in a similar manner similar to heat up in an actual catalytic device on an automobile. When the temperature in the bed increased sufficiently, catalytic oxidation of the carbon monoxide and hydrocarbons and reduction of the nitrogen oxide and the steam commenced and the temperature increased at an accelerated rate due to the heat of reaction. The catalyst performance was measured by determining the carbon monoxide index of the catalyst of Example 1 and comparing this index with the carbon monoxide index of the catalyst on solid pellets. This data is presented in Table 2 below:

TABLE 2

|  | Carbon Monoxide Index |
| --- | --- |
| CATALYST OF EXAMPLE 1 | 0.67 – 0.69 |
| CATALYST ON SOLID PELLETS | 0.80 – 0.90 |

The carbon monoxide index compares the conversion of carbon monoxide of the catalyst being tested with the conversion of carbon monoxide by a reference catalyst. A low carbon monoxide index indicates high catalytic activity.

What is claimed is:

1. A catalyst for converting carbon monoxide, hydrocarbons and nitrogen oxides in auto exhaust gases to innocuous entities consisting essentially of platinum or palladium distended as a coating of alumina containing about 5 to 20 weight percent ceria on a porous tubular ceramic support with internal reinforcing ribs, having a diameter of about 3 to 12 mm and a length about equal to the diameter said support characterized by:
   a. a geometric surface area of about at least 50% greater than a hollow tube of the same diameter,
   b. a surface area approximately 3 times greater than the surface area of solid particles,
   c. a crush strength of at least 10 pounds, and,
   d. a microporosity of 20 to 50% by volume.

2. The catalyst according to claim 1 wherein the catalyst is a platinum or palladium catalyst wherein the platinum or palladium is present in a 1 to 3 weight ratio.

3. The catalyst according to claim 1 wherein the ceramic is cordierite, mullite, alumina or spinel.

4. The catalyst according to claim 1 wherein the tubular ceramic support is coated with about 5 to 10 weight percent of an alumina containing about 0.02 to 0.08 weight percent platinum or palladium based on the weight of the catalyst.

* * * * *